3,202,577
PROCESS OF TREATING DIARRHEA WITH RESINS
Richard Louis Markus, Montclair, N.J., assignor to White Laboratories, Inc., Kenilworth, N.J., a corporation of New Jersey
No Drawing. Filed May 25, 1962, Ser. No. 197,568
8 Claims. (Cl. 167—55)

This invention relates to the use of loosely cross-linked swellable resins in the treatment of diarrhea. This application is a continuation-in-part of my copending application Serial No. 690,897, filed October 18, 1957, now abandoned, which in turn is a continuation-in-part of my application for "Batchwise Copolymerization Technique," Serial No. 439,875, filed June 28, 1954, and now U.S. 2,810,716.

The swellable resins useful for the present invention are, in general, irregular granules of very high molecular weight carboxylic type ion-exchange resins, e.g., acrylic acid type polymers which are very loosely cross-linked with about 0.01–2.0 percent by weight of a poly-unsaturated copolymerizable cross-linking agent and which have only a negligible chain (linear or branched) content.

The major component of the swellable resins useful for the present invention consists of one or more monomeric materials, capable of both homopolymerization and copolymerization such as acrylic acid, salts of acrylic acid, methacrylic acid, salts of methacrylic acid, fumaric acid, maleic acid, maleic anhydride, itaconic acid, with acrylic acid being preferred. These monomeric materials will be collectively referred to hereinafter as "acrylic type monomeric material" or "an ethylenically unsaturated carboxylic acid."

The poly-unsaturated copolymerizable cross-linking agents which form the minor component of the swellable resins have two or more double bonds subject to cross-linkage with the monomeric materials previously defined and may be either aromatic or aliphatic.

The aliphatic copolymerizable cross-linking agents which can be used are those which are soluble in the momoner used or those in which the monomer used is soluble. They have the following characteristics: (1) They have at least 5 or 6 carbons in the chain. (2) They have at least two double bonds in the chain, which are at the terminal carbon atoms. These double bonds are separated by at least two carbon atoms. (3) The terminal carbons may have substituted thereon, one or two methyl groups. Thus, the minimum required chain length may be obtained by methyl substituents on the terminal carbons, e.g., 2,5-dimethyl-2,4-hexadiene is included. (4) Any of the carbons in the chain may be methyl substituted. (5) The center portion of the chain, i.e., that portion between the terminal double bonds, may contain one or more moderately polar functional groups, e.g., hydroxyl, esters, ketones, secondary and tertiary amides, double bonds, triple bonds, $SO_2$, et cetera, or the chain may be ether, imino, or thioether interrupted. These functional groups are preferably present only in the longer chain aliphatics, where they serve to increase the solubility of the cross-linking agent in the monomer or vice-versa. Solubility of the cross-linking agent in the monomer, or of the monomer in the cross-linking agent has been found to be an accurate criteria for predicting whether a particular aliphatic compound will form a cross-linked polymer with the monomer.

The aliphatic cross-linking agents are especially preferred in the swellable resins of the present invention because by their use the resin may be prepared and fully cured within a few hours, and because the resin obtained is colorless.

The aromatic cross-linking agents which can be used are benzene rings substituted by at least two vinyl or isopropenyl groups, i.e., substituted benzene bearing as its sole substituents from 2 to 3 alkenyl groups of the formula

wherein $n$ is an integer from 0 to 1. Divinylbenzene is the preferred aromatic cross-linking agent. In general, the usable aromatic cross-linking agents result in resins which take five or more days to cure to maximum swellability, and which are colored.

Suitable cross-linking agents include: N,N-diallylacrylamide, diallylmethacrylamide, 3,4-dihydroxy-1, 5-hexadiene, 2,5-dimethyl-3, 4-dihydroxy-1, 5-hexadiene, 2,5-dimethyl-1, 5-hexadiene, divinylbenzene, diallyl sucrose or other diallyl sugar, divinylether of diethylene glycol, trivinyl benzene, 2,7-dimethyl-1, 7-octadiene, 1,7-octadiene, p-diisopropenylbenzene, 1,3,5 - triisopropenylbenzene, 1,1,3,3 - tetraallyl - 1,3 - propanediol, 1,1,3,3 - tetramethallyl-1,3-propanediol, 4,6-dimethyl-4,6-dihydroxy-1,8-nonadiene, 2,4,6,8-tetramethyl-4,6-dihydroxy-1,8 - nonadiene, nonadiene-1,8 2,8 - dimethylnonadiene-1,8 2,5-dimethyl-1,5-hexadiene-3-yne; with the aliphatics and especially 3,4-dihydroxy-1,5-hexadiene and 2,5-dimethyl-3,4-dihydroxy-1,5-hexadiene and diallyl sucrose being preferred.

The swellable resins useful for the present invention can contain from about 0.01 to about 2 percent of cross-linking agent, with 0.15–0.25 percent constituting a preferred range. The optimum amount of cross-linking agent required will depend to a certain extent on the nature of the cross-linking agent employed.

The unusual utilities of the resins used in the process of the present invention are due, at least in part, to their swelling characteristics. These swelling characteristics are dependent upon the pH of the media in which they are placed, with the amount of swelling increasing as the pH rises. Thus, in the low pH regions of the stomach the preferred resins absorb only about 15–35 cubic centimeters of the gastric juice per gram of resin, and as the resin proceeds through the gastro-intestinal tract, the pH of the body fluids rises and swelling increases until in the neutral or basic intestinal juices, the resins absorb about 100 cubic centimeters of intestinal juice per gram of resin. Thus, comparatively little bulk is provided in the stomach, with maximum bulk being provided in the body just prior to elimination.

Where more than about 2 percent of cross-linking agent is employed, the resins do not swell appreciably, and the exchange capacity of the resins is limited due to its dense structure. Where less than about 0.01 percent of cross-linking agent is employed, chain polymers (linear or branched) result rather than the desired cross-linked copolymers. The resins of this invention consist essentially of cross-linked polymer, i.e., they contain only a negligible amount, viz., less than one percent, linear chain polymer.

It can be seen that the resins useful as anti-diarrheal agents must contain an accurately defined, closely-controlled amount of cross-linking agent, and the method of U.S. 2,810,716 can be used to obtain resins having only the desired amount of cross-linking agent present. The method of that patent is especially directed to reacting the monomeric material with 0.01–0.2 percent of a poly-unsaturated cross-linking agent, but it is also suitable for the slightly higher amounts of cross-linking agent needed to make the resins which are useful in the present invention. As shown therein, the copolymerization is carried out by contacting the monomeric materials and the cross-linking agent in the presence of an aqueous solution of a soluble nonredox divalent inorganic ion employed in a concentration above about one-half molar (e.g., saturated magnesium sulfate brine) at temperatures above room temperature and up to reflux. A suitable copolymerization initiator, e.g., benzoyl peroxide or azobisisobutyronitrile, is employed in the amount of between 0.01 and 1.0 percent by weight of the reactant monomeric material.

A preferred embodiment of the present invention includes the addition of a small amount of a non-cross-linking, non-toxic polymer lubricant to the resin composition, e.g., glyceryl distearate, Italitan talcum, or 2,6-di-tertbutyl-4-hydroxy toluene. These may be added during the manufacture of the resin or later when the resin is compressed into tablets. The use of such polymer lubricants in small amounts (up to about 5 percent by weight of the resin) tends to accelerate swelling rate and increase amount of swelling of the resins.

The following examples will aid in illustrating some of the resins of the present invention but are not to be construed as limiting.

Cross-linking agent:
- (3) 2,5-dimethyl-3,4-dihydroxy-1,5-hexadiene
- (5) Divinylbenzene
- (10) p-Diisopropenylbenzene
- (12) 1,1,3,3-tetraallyl-1,3-propanediol
- (13) 1,1,3,3-tetramethallyl-1,3-propanediol
- (14) 4,6-dimethyl-4,6-dihydroxy-1,8-nonadiene
- (15) 2,3,6,8-tetramethyl-4,6-dihydroxy-1,8 - nonadiene
- (19) 3,4-dihydroxy-1,5-hexadiene
- (20) 2,5-dimethyl-1,5-hexadiene Polymerization initiator:
- (a) Azobisisobutyronitrile
- (b) Benzoyl peroxide

| Ex. No. | Monomer and grams thereof | | Cross-linking agent and grams thereof | | Initiator and grams thereof | | Polymerization conditions | | Curing time | Yield in grams |
|---|---|---|---|---|---|---|---|---|---|---|
| | | | | | | | Time (minutes) | Temperature (degrees C.) | | |
| 2 | (A) | 100 | (5) | 1.2 | (b) | 1.0 | 16 | 95 | 5 days | 80 |
| 3 | (A) | 100 | (5) | 0.92 | (a) | 0.4 | 13 | 95 | 3 days | 78.2 |
| 4 | (C) | 100 | (5) | 0.92 | (b) | 1.0 | 13 | 95 | 5 days | 64.5 |
| 5 | (A) | 100 | (3) | 0.59 | (a) | 0.3 | 20 | 95 | 2 hours | 90 |
| 6 | (G) | 100 | (5) | 2.2 | (b) | 1.0 | 60 | 65 | 5 days | 80 |
| 7 | (H) | 100 | (5) | 0.92 | (a) | 0.3 | 120 | 95 | 2 days | 83 |
| 8 | (A) / (K) | 50 / 50 | (5) | 0.92 | (a) | 0.3 | 40 | 94 | do | 89 |
| 9 | (A) | 100 | (19) | 0.8 | (a) | 0.3 | 20 | 95 | 2 hours | 81 |
| 10 | (A) | 100 | (14) | 1.0 | (a) | 0.3 | 15 | 84 | do | 88 |
| 11 | (A) | 100 | (15) | 1.15 | (a) | 0.3 | 5 | 92 | do | 75 |
| 12 | (A) | 100 | (12) | 0.60 | (a) | 0.3 | 5 | 87 | do | 82.5 |
| 13 | (A) | 100 | (13) | 0.76 | (a) | 0.3 | 17 | 92 | do | 50 |
| 14 | (A) | 100 | (10) | 0.50 | (a) | 0.3 | 5 | 92 | 5 hours | 72 |
| 15 | (C) / (K) | 100 / 9 | (5) | 0.92 | (a) | 0.3 | 16 | 93.5 | 2 days | 90 |
| 16 | (H) | 100 | (19) | 0.92 | (b) | 1.0 | 41 | 93.5 | 3 hours | 85 |
| 17 | (A) | 100 | (5) | 0.92 | (b) | 2.0 | 35 | 94 | 27 min | 81 |
| 18 | (A) | 100 | (15) | 1.53 | (a) | 0.3 | 4 | 92 | 5 hours | 77 |
| 19 | (A) | 100 | (13) | 1.52 | (a) | 0.3 | 3 | 92 | 97 min | 48 |
| 20 | (C) | 100 | (3) | 1.0 | (a) | 0.3 | 40 | 94 | 35 min | 89 |
| 21 | (C) | 100 | (15) | 1.0 | (a) | 0.3 | 30 | 85 | 105 min | 39 |
| 22 | (G) | 50 | (5) | 0.5 | (a) | 0.15 | 17 | 85 | 23 hours | 47 |
| 23 | (A) | 100 | (20) | 0.8 | (a) | 0.3 | 25 | 95 | 1 hour | 66 |
| 24 | (A) | 59 | (19) | 0.006 | (a) | 0.175 | 11 | 93 | 79 min | 41 |

EXAMPLES

Example 1

A mixture of 60 parts acrylic acid, 0.63 part of divinyl benzene and 0.60 part of benzoyl peroxide was added while stirring to 950 volume parts of a saturated magnesium sulfate brine maintained at steam temperatures. Polymerization occurred within about one hour. The resultant polymer was then heated at about 95 degrees centigrade for an additional four days for curing purposes. The resultant cured resin was carefully washed with hot water and then dried. There was thus obtained about 80 percent of the theoretical amount of loosely cross-linked amber-brown swellable resin containing about 1 percent cross-linking agent.

Following the porcedure of Example 1, many other loosely cross-linked resins were prepared, as shown in the following chart. For convenience, in the following chart, the acrylic type monomeric material used is designated by a capital letter, the cross-linking agent is designated by a number, and the polymerization initiator by a small letter, according to the following key.

Monomer:
- (A) Acrylic acid
- (C) Methacrylic acid
- (G) Maleic anhydride
- (H) Sodium acrylate
- (K) Monoethyl fumarate

Example 25

To one gallon of soft tap water at 90–95 degrees centigrade in a glass-lined container equipped with stirrer, condenser and temperature controls, is added, with rapid stirring, 76 pounds of USP magnesium sulfate. After 5–10 minutes' stirring, it is cooled to 78–82 degrees centigrade. A premixture at 15–25 degrees centigrade containing 8.7 pounds of glacial acrylic acid, 0.13 pound of polyallyl sucrose monomer (sucrose containing between 2 and 8 allyl groups per molecule but preferably 3 allyl groups), and 11.7 grams of azobisisobutyronitrile is then added. Polymerization begins immediately and reaches a maximum after about 5 minutes. Stirring of the system is then maintained for a total of 90 minutes at a temperature of 90 degrees centigrade.

The hot brine-polymer mixture is diluted with 2 gallons of 25–30 degrees centigrade tap water, poured into a fine stainless-steel screen, allowed to drain, spray washed or sparged with stirring with an additional 1.5 gallons of 30 degree centigrade tap water. The product is washed on the screen with five separate 1.5 gallon portions of tap water, all of which except the second is at 25–30 degrees centigrade; the second is with hot water at 70–80 degrees centigrade. After the last washing, the cross-linked product is drained completely and dried in hot, 90–95 degrees centigrade, flowing air for 72 hours.

A yield of 8.1 pounds or over 93 percent of theoretical based on the starting weight of acrylic acid is obtained of a dry, white granular, free flowing product.

Example 26

Using a procedure similar to that of the previous example, 130 pounds of glacial acrylic acid was cross-linked with 105 cubic centimeters of divinyl glycol in the presence of 16 gallons of water containing 1,100 pounds of USP magnesium sulfate using 175 grams of azobisisobutyronitrile as the catalyst. After three hot washings and two cold washings with 400 gallon portions of water, the resin was dried. About a 90 percent yield of product was obtained.

*Example 27*

A mixture of 1000 grams of acrylic acid, 8.0 cubic centimeters of 3,4-dihydroxy-1,5-hexadiene and 3.0 grams of azobisisobutyronitrile was added while stirring to a hot brine (about 90 degrees centigrade) consisting of 16,360 grams of $MgSO_4 \cdot 7H_2O$ and 6400 cubic centimeters of water. Copolymerization was complete within 2 hours, and the brine was then separated from the cross-linked resin by filtration. The resin was then washed several times with hot water (until the optimal swelling is obtained). Then 4 grams of a food-grade non-toxic polymer lubricant, glyceryl distearate, was mixed into the swollen resin and the resin was then dried. There was thus obtained 800 grams of hydrophilic resin, which swelled in artificial intestinal juice by absorbing close to 120 cubic centimeters per gram of resin.

The loosely cross-linked resins of the present invention have proved to be effective as anti-diarrheal agents in clinical tests. They are effective in comparatively low doses and do not cause any undesirable side effects. The resins are administered orally, either plain in their granulated form, or preferably as tablets or capsules.

To illustrate typical results, the resin was supplied various clinical investigators in the form of tablets containing 0.5 gram of the active resin material, together with a small amount of magnesium stearate as a binder and lubricant. One clinician tested the resin on 8 cases of diarrhea, attributed to the following causes: enterocolitis (viral)—3, irritable colon—2, ulcerative colitis—1, reaction to Achromycin—1, reaction to liver–vitamin B complex injections—1. In six of the cases the diarrheal episode had persisted for 2 weeks or longer before treatment with the resin was initiated. The resin was administered in a dosage of 2 tablets every 2–4 hours. In all cases but the ulcerative colitis, diarrhea was satisfactorily controlled within a relatively short time. Another clinician treated 16 cases of diarrhea with the resin. Three of these were cases of acute enteritis and 13 were cases of chronic diarrheal states due to functional or organic disorders. The usual dosage of the resin was 1 tablet every hour in the acute cases and 3 to 6 tablets daily in the chronic cases. Satisfactory response to the resin was manifested in all chronic cases by decrease in both frequency and looseness of bowel movements. The acute diarrheas responded more dramatically to the resin than to the usual anti-diarrheal drugs.

The invention is not to be limited to the use of the specific resins shown and described as many obvious equivalents will be apparent to those skilled in the art. The invention is particularly pointed out and described as follows.

I claim:

1. The process of treating diarrhea in humans which comprises the oral administration to a person suffering from diarrhea of dosage units of a loosely cross-linked swellable resin, which resin consists essentially of a polymer of an ethylenically unsaturated carboxylic acid cross-linked with about 0.01 to 2.0 percent by weight of a cross-linking agent, wherein the monomer of the said carboxylic acid is capable of both homopolymerization and copolymerization, and wherein the cross-linking agent is an aliphatic compound having at least 6 carbon atoms in the chain, and at least two double bonds, separated by at least two carbon atoms, in the chain at the terminal carbon atoms thereof, and wherein the cross-linking agent is capable of forming a solution with the monomer of the said carboxylic acid.

2. The process of claim 1 wherein the ethylenically unsaturated carboxylic acid is acrylic acid.

3. The process of treating diarrhea in humans which comprises the oral administration to a person suffering from diarrhea of dosage units of a loosely cross-linked swellable resin, which resin consists essentially of a polymer of an ethylenically unsaturated carboxylic acid cross-linked with about 0.01 to 2.0 percent by weight of a substituted benzene bearing as its sole substituents from 2 to 3 alkenyl groups of the formula

wherein $n$ is an integer from 0 to 1.

4. The process of claim 3 wherein the ethylenically unsaturated carboxylic acid is acrylic acid.

5. The process of treating diarrhea in humans which comprises the daily oral administration for a period of not less than 3 days to a person suffering from diarrhea, of the following loosely cross-linked swellable resin: a copolymer of acrylic acid cross-linked with about 0.15 to 0.25 percent by weight of a cross-linking agent selected from the group consisting of (a) divinyl benzene, (b) 2,5-dimethyl-3,4-dihydroxy-1,5-hexadiene, (c) 3,4-dihydroxy-1,5- hexadiene, (d) 4,6-dimethyl-4,6-dihydroxy-1,5-nonadiene, (e) 1,1,3,3-tetraallyl-1,3-propanediol, and (f) diallyl sucrose.

6. The process of claim 5 wherein the resin is administered in combination with up to 5 percent of the weight of the resin of a non-toxic polymer lubricant.

7. The process of treating diarrhea in humans which comprises the oral administration to a person suffering from diarrhea of dosage units of a loosely cross-linked swellable resin which consists essentially of a polymer of acrylic acid cross-linked with about 0.01 to 2.0 percent by weight of divinylbenzene.

8. The process of treating diarrhea in humans which comprises the oral administration to a person suffering from diarrhea of a loosely cross-linked swellable resin which consists essentially of a polymer of acrylic acid cross-linked with about 0.01 to 2.0 percent by weight of 3,4-dihydroxy-1,5-hexadiene.

No references cited.

JULIAN S. LEVITT, *Primary Examiner.*

FRANK CACCIAPAGLIA, JR., *Examiner.*